Oct. 14, 1969    L. B. BLOOMFIELD ET AL    3,473,010
APPARATUS AND METHOD FOR DETERMINING MEAN PARTICLE VOLUME
Filed March 22, 1965    7 Sheets-Sheet 1
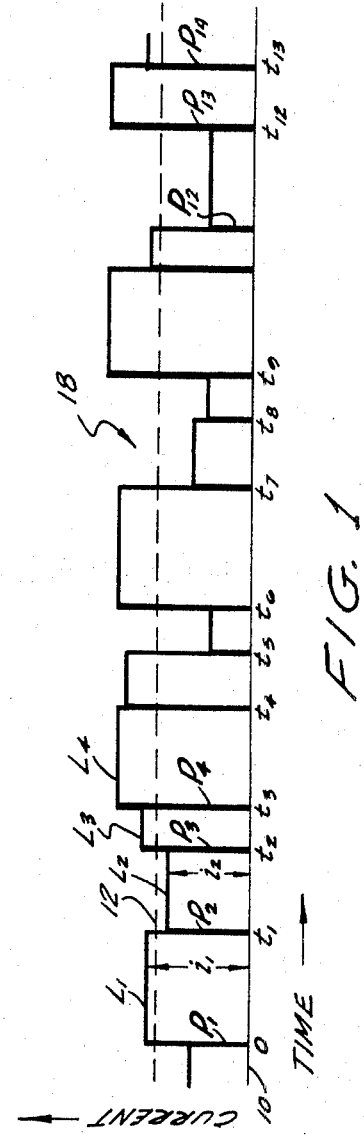
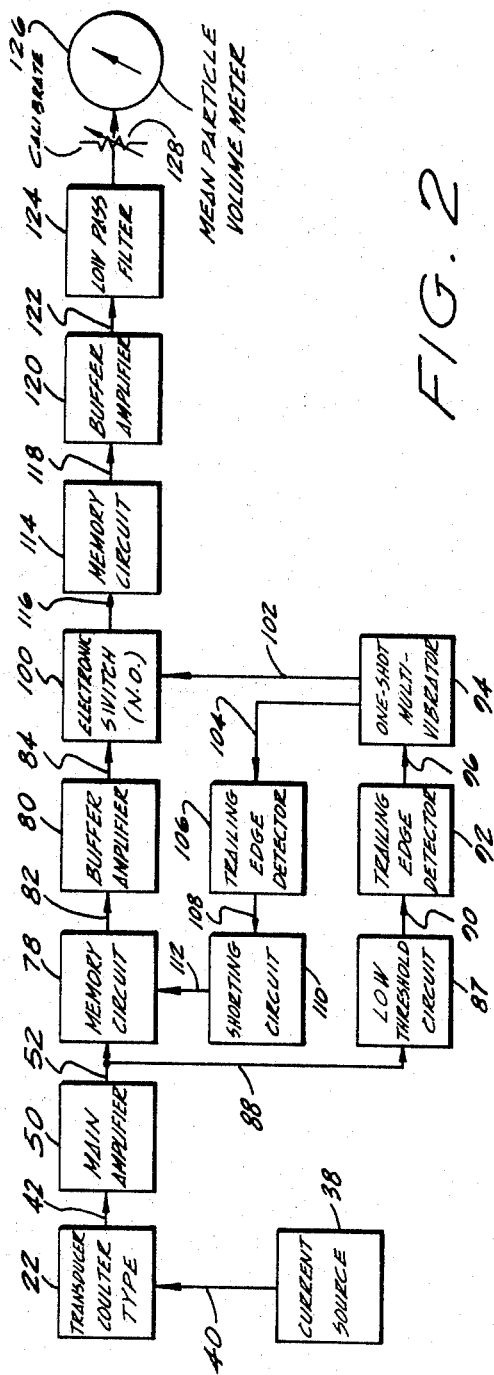
INVENTORS:
LEO B. BLOOMFIELD
WALTER R. HOGG
WALLACE H. COULTER
ERVIN L. DORMAN
BY
Silverman + Cass
ATTYS Oct. 14, 1969  L. B. BLOOMFIELD ET AL  3,473,010
APPARATUS AND METHOD FOR DETERMINING MEAN PARTICLE VOLUME
Filed March 22, 1965  7 Sheets-Sheet 2
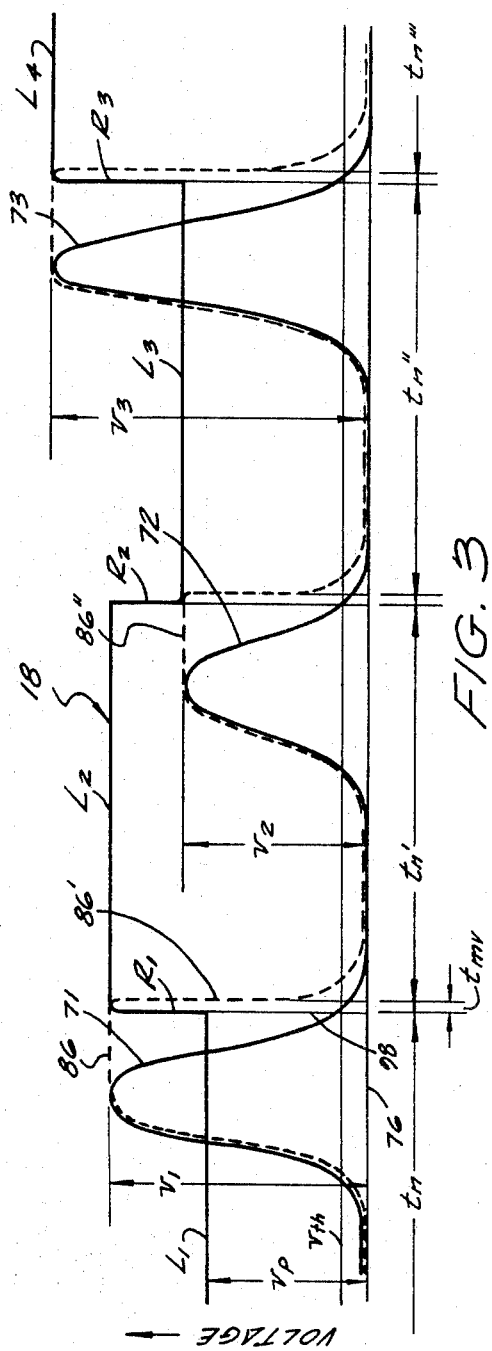
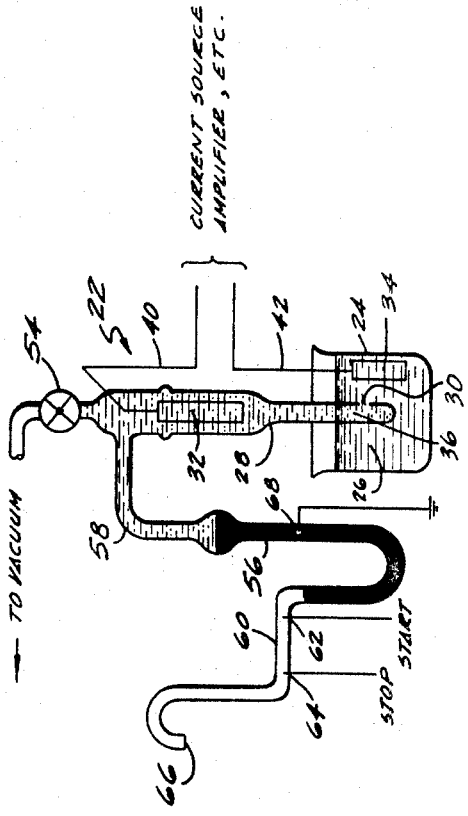
INVENTORS:
LEO B. BLOOMFIELD
WALTER R. HOGG
WALLACE H. COULTER
ERVIN L. DORMAN
BY
Silverman + Cass

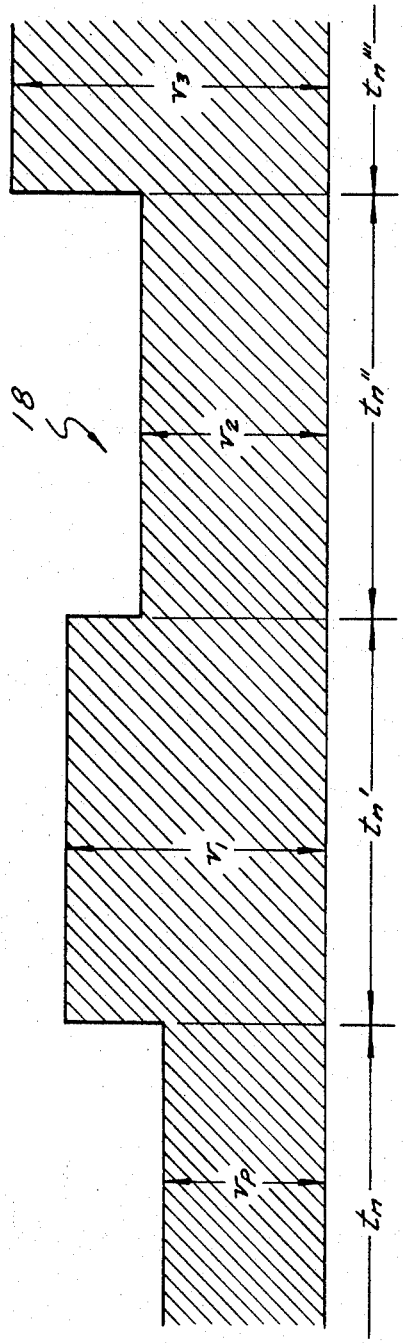
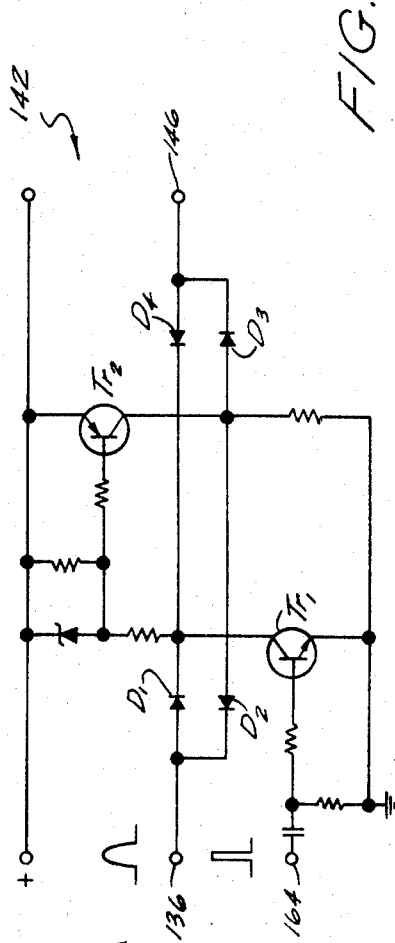
FIG. 3a
FIG. 7
INVENTORS:
LEO B. BLOOMFIELD
WALTER R. HOGG
WALLACE H. COULTER
ERVIN L. DORMAN
BY
Silverman + Cass
ATTYS

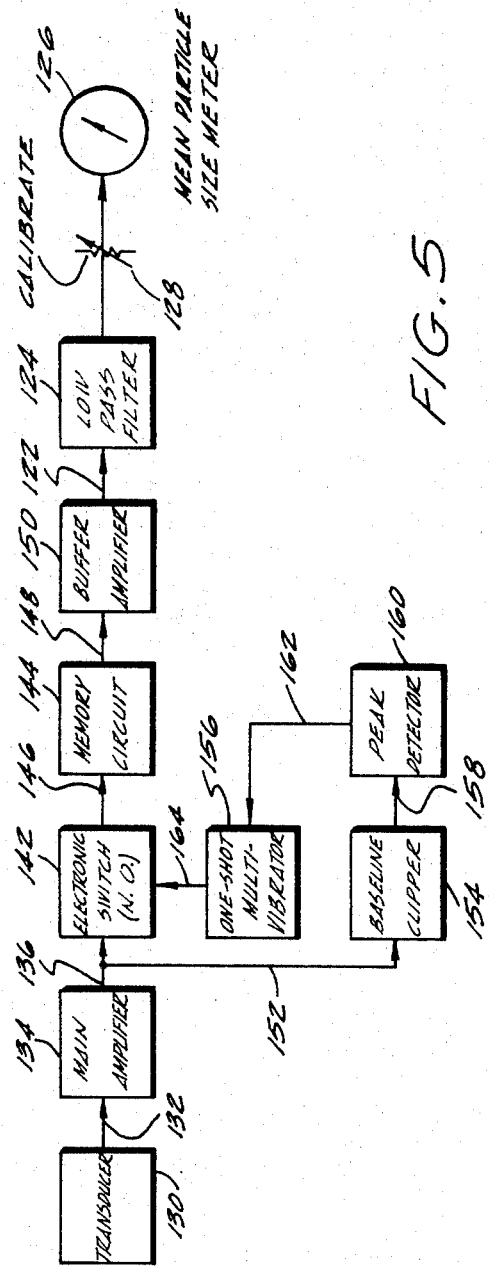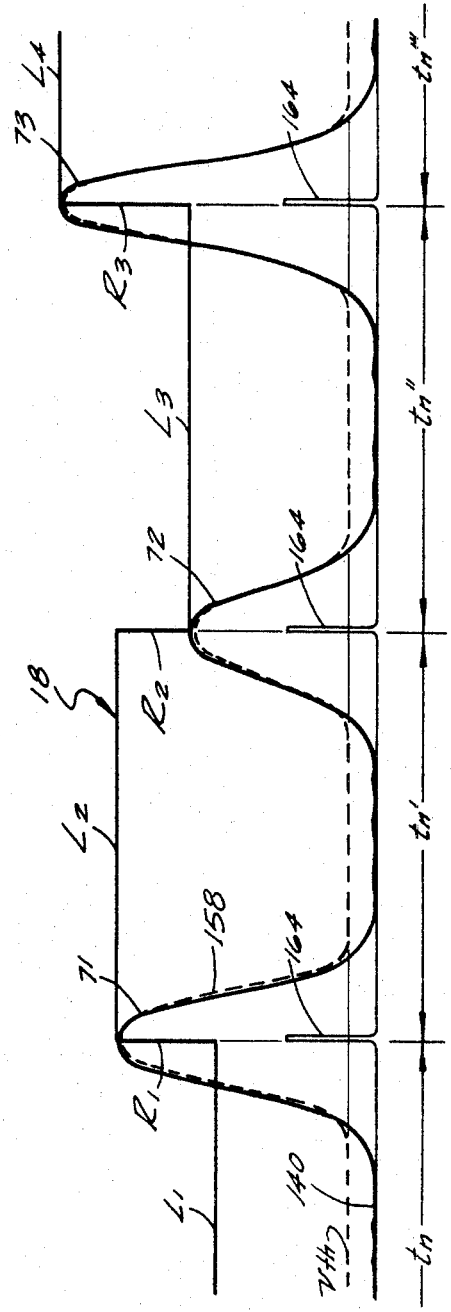

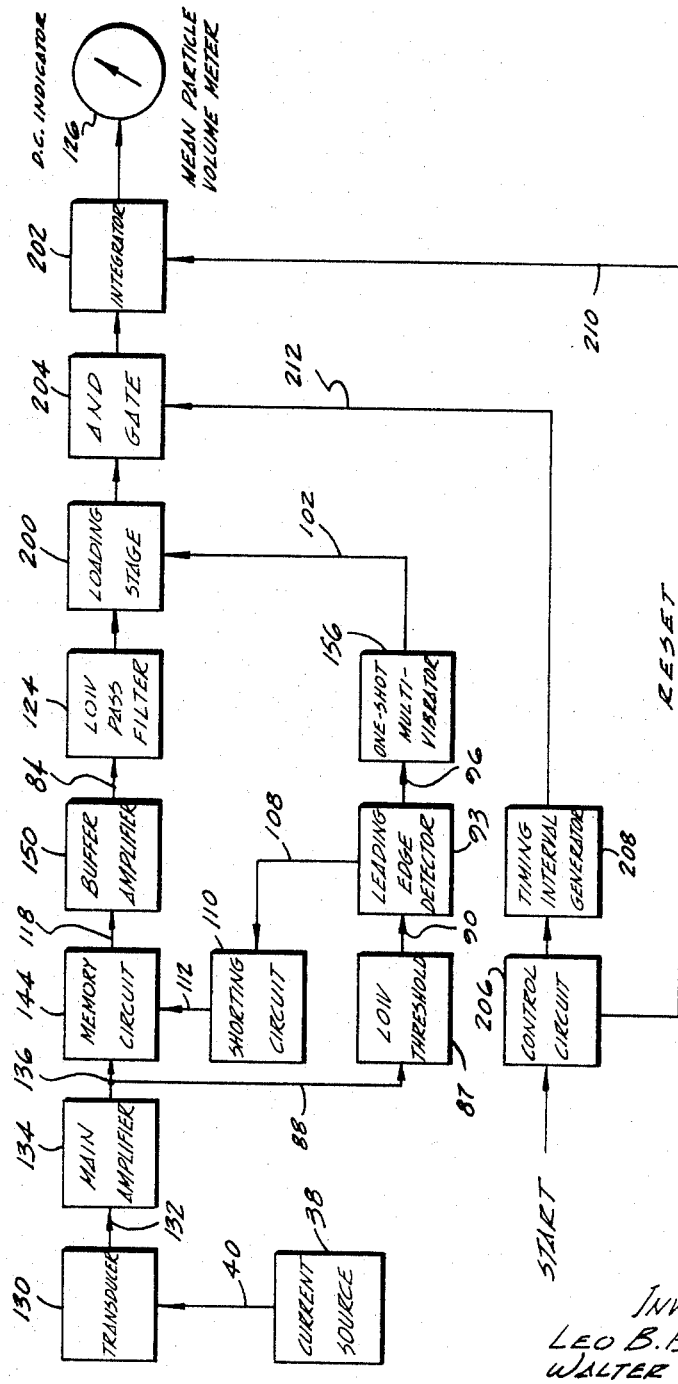

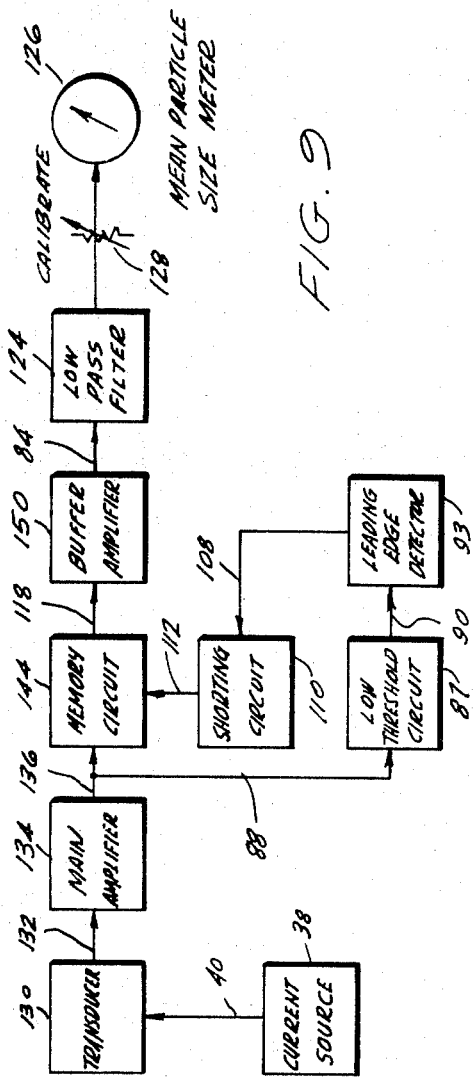
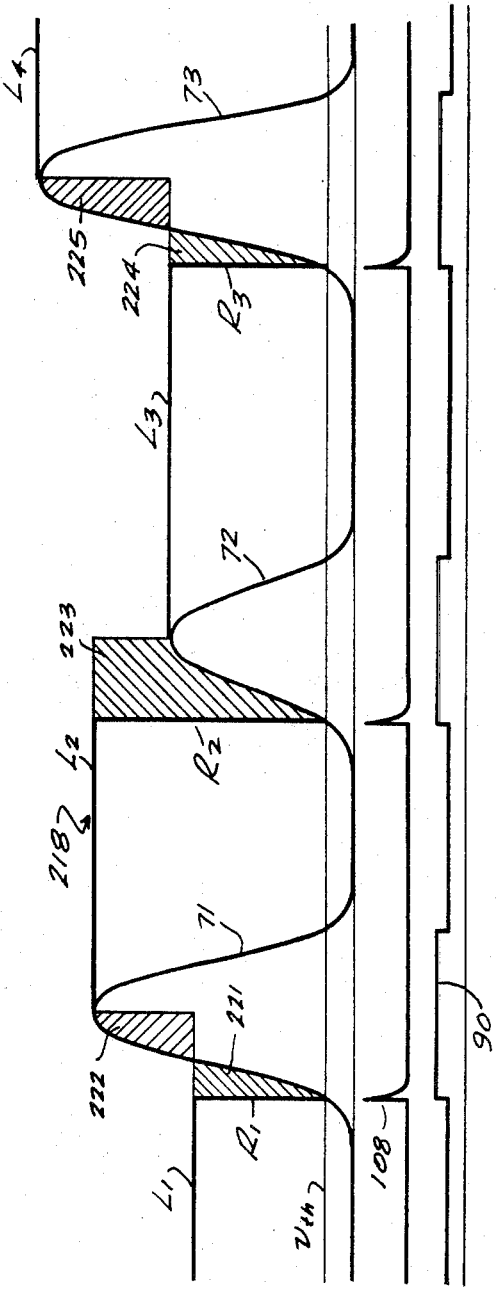

United States Patent Office 3,473,010
Patented Oct. 14, 1969

3,473,010
APPARATUS AND METHOD FOR DETERMINING MEAN PARTICLE VOLUME
Leo B. Bloomfield, Miami, Walter R. Hogg, Hialeah, Wallace H. Coulter, Miami Springs, and Ervin L. Dorman, Hialeah, Fla., assignors to Coulter Electronics, Inc., Hialeah, Fla., a corporation of Illinois
Filed Mar. 22, 1965, Ser. No. 441,481
Int. Cl. G06g 7/48, 7/50
U.S. Cl. 235—184                          32 Claims

ABSTRACT OF THE DISCLOSURE

Method and apparatus for determining the average amplitude of a series of pulses so as to determine the mean size and/or volume of particles in a particulate system from which system the series of pulses is transduced. The peak amplitudes of the transduced pulses are discretely and sequentially stored and converted to form a monopolar histogrammic signal, the average amplitude of which is derived and subsequently integrated with respect to time. The average histogrammic value, in certain embodiments, is reduced to componsate for abnormal pulse amplitudes caused by the coincidence of particles in the ambit of the transducer.

Apparatus for effecting the above disclosed method temporarily detects and stores the peak amplitude of each transduced pulse and retains such stored amplitude until the next succeeding pulse effects the detecting and storing of its amplitude. The supplementing of each amplitude by the next is accomplished by a pair of series coupled memories interposed and by peak responding and control circuitry. In one embodiment, the latter of the two memories is shorted prior to its receipt of each new level to thereby proportionately diminish the average amplitude as a function of the coincidence of transduced particles. Another embodiment employs proportionate loading of the same memory to diminish the average value and compensate for coincidence of particles. A preferred form of the transducer is that of the Coulter type which generates discrete pulses each having an amplitude proportionate to the volume of a scanned particle carried in a liquid suspension.

---

This invention relates generally to the art of particle analysis and more particularly is concerned with novel apparatus and a method for quickly and accurately determining the mean particle volume of a sample of particles.

The particles with which the invention herein is concerned comprise biological particles such as blood cells, bacteria and the like, and microscopic particles found in industry including powders, slurries, dusts, emulsions and the like. Such particles are capable of being counted and sized by known apparatus, especially that apparatus which uses a principle that depends upon the passage of a particle in suspension through an electrical sensing zone of such dimensions so that the presence of each particle will significantly change the impedance of the zone. This change in impedance is utilized to produce an electrical pulse, the duration of which is the same as the time that the particle required in passing through the sensing zone, and the amplitude of which is proportional to the volume of the particle.

The principle is known as the "Coulter principle" and apparatus utilizing this principle is described in U.S. Patent No. 2,656,508 issued Oct. 20, 1953 to Wallace H. Coulter, one of the applicants herein, and assigned to the same assignor as the application herein.

The Coulter principle is ideally used in connection with the invention herein because the amplitude of the electrical signals produced by particles according to this principle depend for all practical purposes upon the volume of the respective particles irrespective of their configuration. Thus, the signal from a given particle is substantially proportional to the mass or true volume of that particle.

The ultimate object of this invention is to provide apparatus and a method by means of which one may determine rapidly the mean particle volume of a sample of particles, preferably by reading this value on a calibrated meter as a single number.

The significance of the achievement of obtaining the mean particle volume of a particulate system may be appreciated more readily if one considers that this value corresponds to the 50% point on the integral characteristic. Half of the total mass of particulate matter occurs above this size of particle in the system. One may use the apparatus and technique of the invention to determine other points on the integral curve of the system.

It is obvious that since apparatus already exist which are capable of counting and sizing particles, one may make measurements and compute mean particle volume, but so far as known, there is no apparatus which can perform this operation quickly and directly by the mere passing of a sample through the apparatus. For example, apparatus known under the trademark Coulter counter is in use throughout the world today which provides data of size and count to enable the preparation of integral and differential graph of size versus count and particulate volume above stated size. These determinations for the most part require long and tedious computations and many operations in all but the more complex devices. Data converting apparatus are provided for use in connection with such Coulter counters, and such apparatus produce the final values without computation, but they are expensive.

Even a device, which provides a differential pulse height discriminator by means of a pair of threshold adjusting controls to establish a pulse size window through which only particle pulses representing a particular range can pass, is not easily used to make the determination. The process is slow and complex. The problem is difficult because one could not know to which settings the windows or threshold values would have to be placed to be precisely on equal sides of the average. The apparatus will count and pass pulses resulting from all particles defined as to size by the threshold levels. One is thus left to make repeated counts over the entire spectrum and compute the average size from these counts.

One apparatus constructed according to the invention has as its output a simple meter calibrated in particle size. One merely passes a sample through the apparatus and reads the meter. There is no need for accurate dilution; no need for measuring the quantity of sample; no need for making any changes or adjustments in the operating controls of the apparatus; no need for calculations or computations. Achieving these advantages comprises another object of the invention.

While the information of mean particle volume is ideally achieved in a single apparatus constructed in accordance with the invention, the method is applicable to the use of components which provide the desired results. For example, the output of a Coulter or other type apparatus could be stored on suitable storage means such as tape, and then fed into a separate instrument or instruments which perform the last steps of the method. The apparatus which acts upon the output of the particle sensing transducer may be in the form of an accessory to a particle counting and/or sizing device.

In industry, mean particle volume has been ascertained from counting and sizing data for various uses. Such information could be useful in working with ink globules, catalysts, emulsions, and abrasives. So far as known, there is no direct method of making the determination, and it is believed that the invention has opened a large and fertile field by providing a simple and reliable tool for ascertaining this index.

In medicine, there has been a method of making the determination which is referred to as the MCV or mean cell volume of biological particles. This method is primarily used in the measurement of the mean cell volume of blood. The MCV of a blood sample is a very valuable index for the diagnosis and treatment of anemias and other diseases whose symptoms may include physical changes in the size of blood cells.

The classical method depends upon the plasticity of red blood rells which enables the centrifuging of a blood sample to cause the cells to pack in the bottom of the vessel, squeezing the plasma to the top. This results in a packed volume or hematocrit whose height relative to the plasma can be determined. With this information and an accurate count of the cells obtained by another operation, one many compute the mean cell volume. The technique has become more widespread in use due to the Coulter counter because prior to the advent of the Coulter counter precise blood cell counting was not as capable of being accurately and quickly achieved. The small number of cells counted, human error and tedium all contributed to the decrease in usage, although the value of the index was always known. With the advent of the Coulter principle and the achievement of accurate counts, the technique of considering MCV in diagnosis and treatment has had a revival. Even with the use of electronic techniques for counting cells accurately, the other steps required in the technique provide room for error and take considerable time. The blood sample used for centrifuging is not small being a minimum of 50 cubic millimeters. In small animals, this poses a problem of excessive bleeding. In determining relative hematocrit, one must read accurately a line of demarcation between a cloudy plasma and the packed cells. One must make the dilution for the blood count accurately. And finally one must make a careful computation.

The reason for the great care is that the differences between normal and abnormal MCV's are very little, but quite significant, nonetheless.

Through the use of the invention, the determination is made in a matter of a few seconds, and is accurate and in a form easily handled. The sample can be extremely small and may even be a continuously flowing sample wherein the electrolyte characteristics are changed continuously giving a varying mean cell volume value and thereby indicating physiological or chemical changes in a cell system.

Industrial particle systems as a general rule have a wide dynamic range of particle size while biological particles have a narrow dynamic range. In both cases, the study of particle count and size requires a careful consideration of coincidence of particles in the sensing zone. It is known through statistical studies of transducers sensing the passage of particles that the number of times that particles will pass through the sensing zone simultaneously will depend upon the concentration of the particles in the suspension and the effective volume of the sensing zone. These two factors in practice respectively are the dilution of the test sample and the diameter of the aperture in the case of the Coulter apparatus. As explained in more detail hereinafter, coincidence correction must be made because insofar as count is concerned, the true count is greater than the number of pulses produced by the transducer and the true average amplitude of the particles passing through the sensing zone is less than the average amplitude of pulses actually produced. Because of this, a factor is added to the counts which are obtained from Coulter apparatus, while in the ascertaining of mean particle volume it will be necessary to decrease the value by some factor.

In some particulate systems, especially of industrial particles, the dilution may be quite high because of the difference in size of the particles, and under such circumstances, it may often not be required to apply a factor of coincidence to the determination, but it is pointed out that there is a compromise which must be made between good statistical sampling and an acceptable level of coincidence. In the case of biological particles, it is quite common to use such concentration that coincidence is going to be a significant factor. Because of the coincidence effect on pulse size distribution, some modification is made to the mean particle volume as determined by the apparatus of the invention, to decrease this value in accordance with the concentration and effective volume of the sensing zone. Actually, this can be done by relating the factor to the number of pulses counted because the coincidence effect is closely proportional to concentration. In the case of the most elementary form of the invention, such modification can be done by statistical computation or by performing another operation on the value after it has been determined. In a preferred form of the invention, the compensation is done automatically.

An important object of the invention is to provide an apparatus and method for determining mean particle volume in which there is an automatic compensation for coincident particles in the sensing zone.

This can be done by several methods, all of them basically comprising discarding a part of the signal produced by operating upon the artificial signal derived from the pulses obtained from the transducer. As will be seen hereafter, the pulses from the transducer or the amplifiers which follow are used to provide an artificial histogrammic signal which is averaged to achieve the desired result. It may be accumulated in an integrator, if desired, before measurement. The area of the histogrammic signal in current form represents total accumulated charge relative to time. If in voltage form, it may readily be converted into a current signal. Since the histogrammic signal is formed of a series of levels, as will be seen, one can decrease the amplitude of each level or render the circuit inoperative for a short time that each level is being produced, or use a combination of both. In one embodiment of the invention, the histogrammic signal is subjected to impulse loading before or after averaging, or after integrating, to withdraw or excise current therefrom at a rate and to an extent which will give the desired compensation. For coincidence effects. This will be described in detail in the specification.

As previously indicated, where a system of random pulses is known to have no significant number of such pulses resulting from coincidence, there would be no need for modification of the results to compensate for coincidence. Such systems often occur or are deliberately provided, as for example, by extreme dilution, but for the most part coincidence is of extreme importance in particle analysis. The invention will be described hereinafter, first without any consideration of coincidence, and thereafter with an explanation of the problem and its solutions. This, it is believed, will enable a better understanding of the invention.

In the simplified form of the invention, a numerical indication is provided of the average amplitude of a string of random pulses produced by a transducer because of the passage of a particle system relative thereto. It is an important object of the invention to provide a method and apparatus for making such an average determination.

It is important to point out the differences between known apparatus for averaging pulses and the invention herein. If a string of random electrical pulses is applied to any one of known averaging devices, the resulting value is the average of the total areas of the pulses spread over the measuring time, thus taking into account the intervals between pulses. Since these intervals are not known, the resulting value is not primarily indicative of pulse amplitude. At most it could be said that the resulting value, if expressed in current, represents a current which, if flowing for the time interval, will produce the charge produced by all of the pulses of the string, accumulated for that same time.

It is apparent that the average current of such a device will not represent average amplitude, because of the existence of the unknown intervals between pulses. It is also apparent that the average current of such known devices will be substantially less than the average amplitude of the pulses producing the same.

In the invention, on the other hand, the string of pulses is operated upon in such a manner that its average amplitude is ascertained, irrespective of the interval between the original pulses of the string. This makes the indication independent of the number of pulses produced over any interval of time, and therefore also independent of the concentration of the suspension of particles causing the pulses (not considering coincidence, for the time being).

According to the simplest form of the invention, the pulses produced by a system of particles passing relative to a transducer are converted into an artificial signal which is continuous in character and is of one polarity so that relatively simple and well-known averaging devices may be used to ascertain the average value of this artificial signal. The achievement of this end forms an important object of the invention.

The more useful form of the invention involves modification of the artificial signal to compensate for coincidence, in the manner mentioned above. The modification in all cases consists of a reduction of this signal in accordance with certain factors, so that the resulting indication reflects the true average. The achievement comprises still another object of the invention.

If one considers that mean particle volumes of a given particulate system is independent of concentration, an interesting test can be made for any method of modifying the artificial signal achieved from the actual pulses. If the modified value does not substantially change for different values of concentration, it follows that the method of modification is valid. The invention is ideally suited for such testing, and as a matter of fact, the method and apparatus used has turned out to be capable of meeting this test over a wide range of aperture sizes and particle sizes. Furthermore, the invention provides means for changing at least one of the modifying factors in the event that concentration changes indicate that the degree of compensation should be changed.

Many objects and advantages of the invention which have not been specifically enumerated will occur to those skilled in the art from a consideration of the description which follows and the appended claims. The invention has a wide application as a tool and instrument for particle study in the industrial as well as the medical and biological fields. The description of certain embodiments are specific to the determination of the mean particle volume of a system of particles directly. This assumes that the particles produce pulses in the transducer which are substantially proportional to their respective volumes or masses. This is a characteristic of those transducers which operate on the Coulter principle.

In other forms of transducer, particularly optical, when particles pass relative to the transducer, the resulting pulses are usually a function of the cross-sectional area intercepted by a beam of light, for example. By the utilization of the invention herein, these pulses are readily operated upon to obtain directly the mean particle cross-sectional area, if one considers that the volume of a sphere is related to its cross-sectional area as the cube of the diameter then is related to the square of the diameter, the direct results may readily be converted into a value indicative of the mean volume or mean diameter of equivalent spheres. Obviously, similar conversions may be made with the results obtained from an apparatus which uses the pulse output from a Coulter type transducer for finding mean average diameter and cross-sectional area of equivalent spherical particles. As a matter of convenience, for example, apparatus of this nature may have a plurality of indicators, giving at the same time mean particle volume, a count of particles for a given time interval, mean particle cross-sectional area, etc.

Preferred embodiments of the invention are illustrated and described in detail hereinafter, principally in connection with the use of the invention in ascertaining the mean particles volume of particles passing through a transducer of the type which produces pulses substantially proportional to the volume or mass of the respective particles producing the same. Certain of the embodiments illustrate methods and apparatus for compensating for coincidence in particulate systems wherein such coincidence is significant, and it will be noted that considerable variation can be made in the details of the invention.

In the drawings:

FIG. 1 is a chart illustrating the basic concept of the invention in a simplified form, and showing the artificial histogram signal derived from the transducer pulses.

FIG. 2 is a block diagram of one form of apparatus utilizing the basic principles of the invention to achieve a value indicative of average particle volume, but without any provision for coincidence compensation.

FIG. 3 is a chart illustrating the various wave forms of the signals in the structure of FIG. 2 and showing the manner in which the histogrammic configuration of FIG. 1 is achieved.

FIG. 3a is a chart of a portion of FIG. 3.

FIG. 4 is a diagram illustrating a Coulter type of transducer suitable for use with the invention.

FIG. 5 is a block diagram of another form of apparatus utilizing the principles of the invention in a manner similar to the apparatus of FIG. 2.

FIG. 6 is a chart illustrating the various wave forms of the signals in the structure of FIG. 5 and showing the manner in which the histogrammic configuration is achieved in this modified form of apparatus.

FIG. 7 is a highly simplified circuit diagram of the electronic switch of FIG. 5.

FIG. 8 is a block diagram of another form of apparatus utilizing the principles of the invention, but in which structure is illustrated which enables compensation for coincidence occurring in the transducer, and further in which an integrator is used to accumulate the charge represented by the signal over a predetermined times interval.

FIG. 9 is a block diagram of a modified form of the invention, comprising primarily a portion of FIG. 8, having a simplified structure for coincidence compensation.

FIG. 10 is a chart illustrating the various wave forms of the signals in the structure of FIG. 9 and showing the manner of achieving the histogrammic configuration therein.

Figure 11:
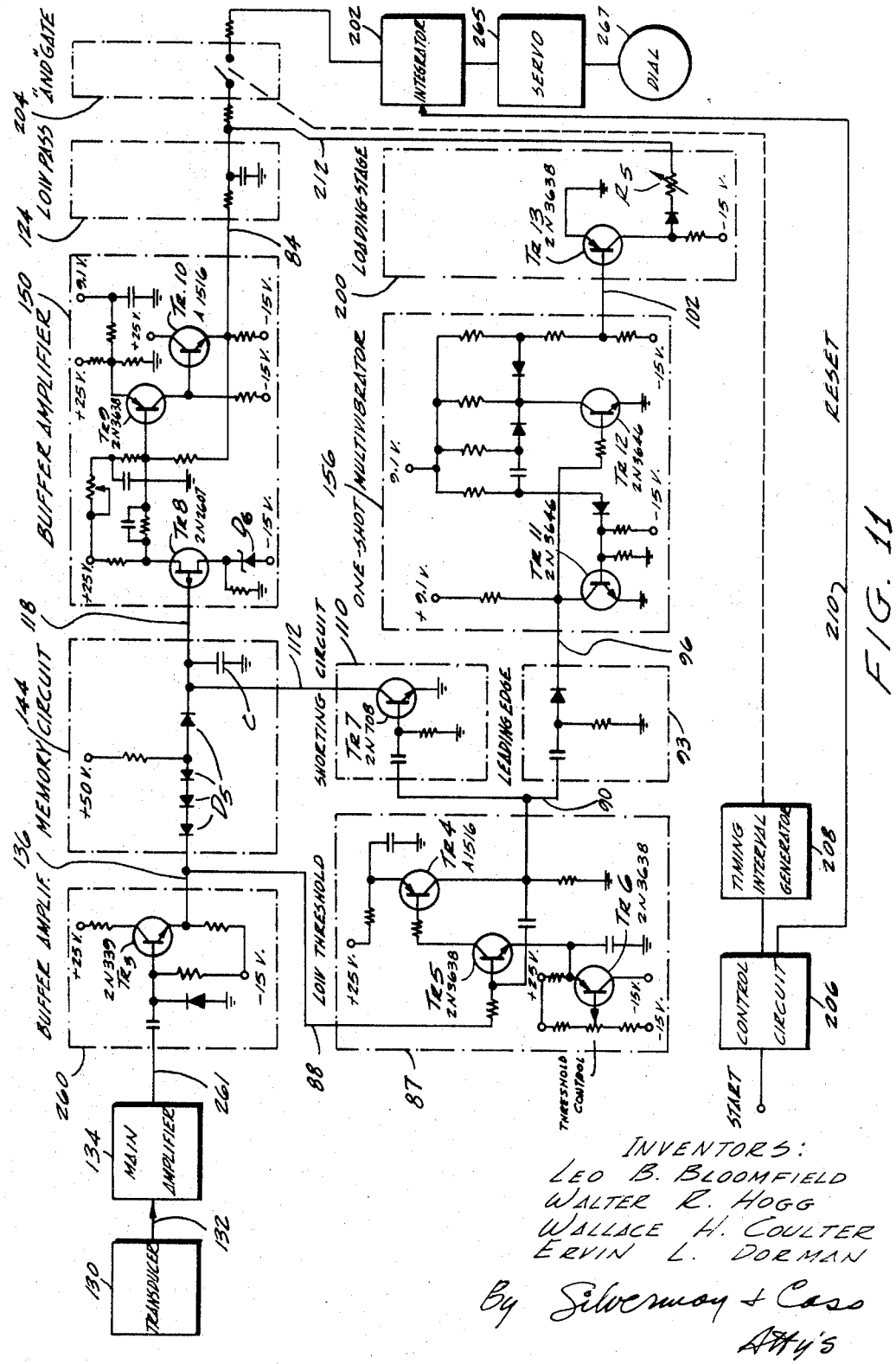
FIG. 11 is a combined circuit and block diagram of a practical apparatus similar to that of FIG. 8.

As previously indicated, the invention is characterized by the provision of a method and means for ascertaining the average amplitude of a string of random pulses produced by the passage of a system of particles through or relative to a transducer which responds to such movement to produce such electrical pulses related to the size of the particles. In the description herein, reference to the word "size" shall be deemed to include diameter, area or volume, although the greatest advantages occur when the transducer responds by producing pulses which are substantially proportional to particle volume or mass, irrespective of their configuration. The reference to the random nature of the pulses signifies that the intervals between pulses as well as their excursions occur with no recognizable pattern.

According to the method of the invention and through the use of the apparatus to be described, the pulses emerging from the transducer and/or its amplifier are normally related to a base line which is fixed at a particular level, usually at zero voltage. The pulse string is operated upon by suitable circuitry to produce a signal which has all of its excursion on one side of that or some other constant base line or level, to produce a signal of histogrammic configuration which is monopolar with respect to the base line. As used herein, the word "monopolar" is intended to mean that all of the signal is on one side of the base line, and "histogrammic" is intended to describe a signal which is made up of vertical bars or rectangles, either contiguous to one another, or separated somewhat as will be explained.

The simplest form of monopolar histogrammic signal, which is of the type that will be described in some detail, is a positive or negative going signal all of which is on one side of a zero voltage or zero current base line, having as its top contour a series of constant levels or plateaus connected by vertical excursions of the signal requiring zero time to move from level to level. Such a signal has its amplitude varying with time. The amplitudes of the respective levels are proportional to the respective sizes of the particles causing the pulses from which said levels are derived. The lengths of the respective levels are equal to the respective distances from pulse to pulse. As will be seen, the levels are achieved by detecting the peaks of the transducer pulses.

Once having achieved this monopolar signal, it is applied to an averaging device, such as for example, a galvanometer having a d'Arsonval movement, which will ascertain what the average level is and indicate the same on the meter. If desired, the signal may be integrated for a predetermined period of time, accumulated to provide an electrical quantity, and then detected by a meter calibrated or adjusted to divide the quantity by the time to give the average value or amplitude for the interval. The meter may have its scale calibrated to read directly particle size. Instead of a meter, there may be any averaging circuit driving a servo system for energizing some other form of indicator. The primary consideration is that the output from the histogrammic signal is averaged to achieve the average amplitude of the levels.

The histogrammic signal which has no time interval between levels would represent the artificially produced signal obtained by operating upon a series of pulses derived in turn from a particle system without regard to coincidence. As mentioned above, coincidence would produce pulses of amplitudes greater than those pulses which would result from passage of single particles, and hence, if one derived the simple histogrammic signal, the average amplitude of the levels would be greater than the true average by some value depending upon the degree of coincidence. According to one embodiment of the invention, one loads the signal, thereby effectively changing its configuration to some form which perhaps is not without time intervals. If one could ideally excise a small portion of the signal at each level, one might be considered as producing a time interval between levels, although in the actual structure the equivalent conveniently would be a portion of an interval, not extending completely to the base line. In any event, the histogrammic signal is or can be converted into a current characteristic, and the modification thereof is achieved by withdrawing a small amount of charge with each change in level, so that the total charge accumulated by an integrator, for example, is decreased in accordance with the function which provides the desired compensation. As stated, this is a form of impulse loading, since it is accomplished each time that a pulse occurs, but to a different degree.

Referring now to the drawings, initially a discussion of the theory of operation of the invention will be set forth, although it is not intended to make the theory a limitation upon the invention, but merely to assist in understanding it. As a matter of fact, in the case of the means for compensating for coincidence, which is described, the theory is complex while the structure which is used is simple, and yet the results achieved apparently fully compensate for coincidence. In any event, the structure and results which flow therefrom are to be taken as the accomplishment of the applicants herein, irrespective of theories described.

Consider first a series of random pulses, all positive going, and separated from one another by random intervals. Such a string is shown in FIG. 1 on a time axis 10. The pulses in this case are designated $P_1$, $P_2$, $P_3$, etc. to $P_{14}$. The vertical axis may be current or voltage. We may assume for the benefit of the discussion that these are current pulses which have been produced by means of passing particles through the transducer of a Coulter apparatus and suitably amplified. Thus, the pulses have amplitudes which are respectively proportional to the volume of the particles which produced them. Further, for this initial explanation, it may be assumed that none of the pulses has been caused by the coincidence of two or more particles occurring together in the sensing zone.

Another assumption which can be made here is that the pulses $P_1$ through $P_{14}$ are of such small duration compared to the interval between pulses, that the width of each of the pulses is negligible insofar as the mathematics is concerned. As a matter of fact, this is usually true in a very low concentration of suspension. Recall that the Coulter apparatus uses a suspension of particles in an electrolyte.

The pulse amplitudes are $i_1$, $i_2$, $i_3$ etc. If we consider the pulses $P_1$ through $P_{14}$, the average amplitude of these pulses would be $$(1) \qquad i_{\text{ave}} = \frac{i_1 + i_2 + i_3 = \ldots i_N}{N}$$

and this value of $i_{\text{ave}}$ would be indicated by the broken line 12. There is no known circuitry which can perform this operation simply, quickly and continuously, due to the fact that the currents do not actually coexist, and do not lend themselves to the customary methods of adding currents. On the other hand, by suitable operation, an artificial signal can be produced which will have such characteristics as to enable a simple measurement to be made which will give the average amplitude $i_{\text{ave}}$.

Thus, if a histogrammic configuration of levels is produced, whereby there is a continuous positive signal whose different levels equal the amplitudes of the respective pulses, it is feasible to apply this signal to simple averaging means to obtain a value for the level 12. In this case the bars or rectangles of the histogram have as their horizontal dimension the interval between pulses, and the levels are the amplitudes of the respective initial pulses defining each bar or rectangle. The configuration of the resulting signal has the level $L_1$ of amplitude $i_1$, the next immediately adjacent level $L_2$ of amplitude $i_2$, the next immediately adjacent level $L_3$ of amplitude $i_3$, etc. The levels change abruptly so that the connecting lines shown in FIG. 1 have infinite slope, this being capable of substantial achievement in suitable circuitry.

Once having acquired the histogrammic signal, which may be designated generally 18, the averaging operation follows. The average current $i_{\text{ave}}$ indicated by the broken line 12 may be defined as the steady current which, when flowing for the time $t_{13}$ will transfer the same charge as the sum of all of the currents $i_1$ through $i_{13}$ for this time $t_{13}$. This latter sum is $$(2) \qquad q = i_1 t_1 + i_2(t_2 - t_1) + i_3(t_3 - t_2) + \ldots i_{13}(t_{13} - t_{12})$$

The average $i_{\text{ave}}$ would be equal to the sum divided by $t_{13}$ or $$(3) \qquad i_{\text{ave}} = \frac{q}{t_{13}}$$

Since $$(4) \qquad q = \int i \, dt$$

each of the products $i_n(t_n - t_{n-1})$ represents a contribution of electrical charge to the output circuit. When there are thousands of these pulses and they are distributed randomly along the time axis, the interval following each of the pulses in any size range will average (5) $$t_{ave} = \frac{T_N}{N}$$

where $T_N$ is the time elapsed including the initial and the Nth pulse. It follows therefore, that the average charge will be (6) $$n_1 i_1 t_{ave} + n_2 i_2 t_{ave} + \ldots n_n i_n t_{ave}$$

where $n_1$ is the number of pulses of a size range and $i_1$ is the current corresponding to that amplitude, $n_2$ and $i_2$ are the number and curent respectively of the next contiguous size range, etc. until $$n_1 + n_2 + n_3 \ldots + n_m = N$$

which will account for all of the pulses of the string.

By this logic, we have an expression for the average current level 12 which is (7) $$i_{ave} = \frac{\sum_{m=1}^{m} n_m i_m t_{ave}}{T_N} = \frac{q}{T_N}$$

In order to operate upon the string of pulses $P_1$, $P_2$, $P_3$, etc., to convert them into the histogrammic signal 18, use of a simple circuit such as shown in block diagram in FIG. 2 may be resorted to. In connection with the circuit, FIG. 3 illustrates an enlarged view of a string of pulses and the operation involved.

In the block diagram of FIG. 2, the source of pulses is the transducer 22 which may comprise the stand or transducer of a Coulter apparatus. The Coulter stand is shown diagrammatically in FIG. 4, this being of a type which is capable of metering a predetermined amount of sample. Obviously, this need not be critical according to the invention if one is making a continuous determination. There is a beaker 24 within which the sample 26 is placed. A Coulter aperture tube 28 is immersed in the sample 26, with its aperture 30 below the surface of the liquid. An electrode 32 in the aperture tube and another 34 in the beaker 24 establish the current between the two bodies of liquid, the one 26 in the beaker and the other 36 on the interior of the aperture tube 28. The current source 38 (see FIG. 2) which provides the transducer aperture current and the signal pulse produced when a particle passes through the aperture 30 are connected to the electrodes through the leads 40 and 42. For the purposes of the block diagram of FIG. 2, these will be designated as channels to make the diagram simple. The channel 40 is the one which connects to the current source, and the channel 42 is the input to the pre-amplifier, amplifier, pulse height discriminator, etc., all of which may be included in the same cabinet with the current source. Since it is assumed that the simple pulses under discussion are the only ones needed, the channel 42 is shown connected directly to the main amplifier 50, and the pulses described above and identified as $P_1$, $P_2$, $P_3$, etc. appear at the point 52 of the block diagram.

In using the Coulter stand 22 a source of vacuum may be connected to the aperture tube 28 through a manual valve 54 and whenever it is desired to make a determination, the valve 54 is opened for a short time to draw the suspension 26 through the aperture 30. If desired, a predetermined amount may be metered by the siphon arrangement shown. This is a well-known device, and comprises a column of mercury 56 above which there is a portion of the liquid 36 so that the branch 58 is a part of the closed system. There is a metering section of capillary tubing at 60 having a start electrode 62 and a stop electrode 64 between which there is defined an accurate volume. The mercury column 56 is unbalanced by means of the valve 54 and then permitted to run back into the metering section toward the open end 66 of the siphon tube. The column 56 being connected with ground at 68, as soon as the start electrode 62 is contacted, a circuit is closed to the counting apparatus or to the apparatus of the invention. This will permit pulses to be counted and/or passed to the operating portions of the apparatus. Then when the mercury column contacts the stop electrode 64, it shuts off the apparatus. In this way, the operator can know exactly the volume of fluid which passed through the aperture 30, and if the dilution is known, an accurate count of the sample is obtained. If an average particle volume determination has at the same time been made, this is additional information.

In FIG. 3 there are illustrated three positive going voltage pulses 71, 72 and 73 which represent signals appearing at the point 52 of the block diagram of FIG. 2. The base line 76 is at zero voltage and hence all of the pulses are monopolar. The amplitudes of the pulses are designated $v_1$, $v_2$, and $v_3$ and these are proportional to the respective volumes of three particles which have passed through the aperture 30 in the time occupied along the base line by the pulses. The pulses normally will be much further apart, but are shown close together for the explanation.

The amplitudes of the incoming pulses at point 52 are held at their maximum level in a memory circuit 78, which comprises a diode and a capacitor, and an amplifier of extremely high input impedance. The amplifier is designated buffer amplifier 80 and signal from the memory circuit is applied to the amplifier at 82. The output from the buffer amplifier 80 appears at 84 and it is shown in FIG. 3 as the broken line 86. Considering the pulse 71, note that the broken line 86 follows the pulse faithfully until the peak of the pulse is reached at $v_1$ from which point, as the pulse itself decays toward the base line 76, the voltage achieved in the memory circuit 78 remains at the level $v_1$. The high impedance amplifier 80 is to prevent loading of the capacitor which is retaining the charge provided by the pulse.

At the same time that this occurs, the pulse 71 is being applied to a low level threshold circuit 87 by the channel 88, the voltage at which this circuit 87 produces an output being indicated by the horizontal line $v_{th}$. As soon as the end of the pulse passes this threshold, an output occurs at 90, is sensed by the trailing edge detector circuit 92, which uses the trailing edge of the threshold circuit output to trigger a one-shot multivibrator 94 through the connection 96. The pulse produced by the multivibrator is a sharp narrow pulse shown at 98. Its width $t_{mv}$ is chosen on the basis of circuit constants, to be substantially less than the average time between pulses, described above as $t_{ave}$.

The ouput pulse 98 of the multivibrator 94 is applied to the normally open electronic switch 100 by the channel 102, and at the same time back to the memory circuit 78 by way of the channel 104, trailing edge detector circuit 106, channel 108, shorting circuit 110 and channel 112. The effect of the latter described arrangement is to cause the mulitvibrator pulse 98 to short circuit a capacitor in the second memory circuit 114 to the output of the first buffer amplifier 80 through the channel 116 and said electronic switch 100 thereby forcing the memory circuit 114 to rise or fall to the same voltage being retained at the output 84 of the first buffer amplifier 80. In the case of the pulse 71, when the pulse 98 operates the electronic switch 100 suddenly to connect the memory circuit 114 with the output of the buffer amplifier 80, since the memory circuit 114 had its capacitor already charged to and holding a voltage of value $v_p$ from a prior pulse (not shown in FIG. 3), the capacitor will charge to a value $v_1$ and this voltage will be retained in the memory circuit 114. The voltage is applied by the channel 118 to a second buffer amplifier 120 and the output of this amplifier ond bucer amplifier 120 and the output of this amplifier appears at 122. In the manner thus far described, the signal at 122 provides the horizontal level $L_1$, the rise $R_1$ following the multivibrator pulse 98, and the level $L_2$ which is the same as the peak voltage $v_1$ of the pulse 71.

The multivibrator pulse is also applied to the trailing edge detector 106 which short circuits the capacitor of the first memory circuit to permit it to drop to zero, following the broken line decay 86' to the base line, so as to prepare the memory circuit for the next pulse to come along.

The next pulse shown is pulse 72 having an amplitude which is $v_2$, substantially less than that of pulse 71 in this example. The memory circuit 78 will follow the pulse upward as shown to the peak voltage $v_2$, and then as the pulse 72 decays, the memory circuit 78 holds the maximum voltage at 86'' until the trailing edge of the pulse 72 crosses the threshold voltage $v_{th}$ and again energizes the multivibrator 94. In this case, the voltage of the second memory circuit 114 is $v_1$ and when its capacitor is suddenly connected to the buffer amplifier 80, which was sitting at voltage $v_2$, the voltage of the amplifier 120 drops along the line $R_2$ to the level $L_3$ at which it remains until the next pulse comes along. The next pulse 73 has a peak voltage of $v_3$ and by the same operation described, the level $L_3$ rises at $R_3$ to the level $L_4$.

The resulting signal which has been reproduced by itself in FIG. 3a, is the monopolar histogrammic signal 18 of FIG. 1. It comprises the output of the amplifier 120 at the channel 122. The time interval of each level which is designated $t_n$, $t_n'$, $t_n''$ and $t_n'''$, respectively, is quite closely equal to the time elapsed between a part of one pulse to the same part of the next pulse. In this form of apparatus, the time interval is taken from the instant that the trailing edge of one pulse crosses the threshold level $v_{th}$ to the instant that the trailing edge of the next pulse also crosses the same threshold level $v_{th}$. As will be explained in connection with a modified form, this choice of the portion of the pulses from which the duration of levels is measured is not limited. For example, in the next structure described below, the peaks of respective pulses are used to establish the interval from level to level.

For the purposes of this explanation, and indeed for most conditions, the amplitude of each level is equal to the maximum excursion above the base line of the pulse which controls the start of that level. Mention will be made of variations from this situation.

Having thus achieved the histogram 18, it is now a simple matter to filter the signal somewhat in a low pass filter 124 and apply it to an averaging device. In FIG. 2, the averaging device is a d'Arsonval galvanometer 126 which will average the current produced in a suitable resistor by the histogrammic signal 18, calibrated by a potentiometer indicated diagrammatically at 128 to produce a reading that is indicative of the average amplitude 12. In the case that the original pulses were proportional to volume, this number comprises the mean particle volume. Instead of using a meter 126 one could use a resistance capacitance circuit for averaging the signal, and apply the same to an electronic indicating device or a servo system for driving a disc or other scale calibrated to read volume. The inertia of meter movements or the time constant of an electronic smoothing circuit may be too great to give sensitive response to the changes in average value of some systems or to reach equilibrium quickly enough after starting a determination, and conversely, decreasing the time constant of the averaging means may result in a vibrating pointer. It is therefore practical to accumulate the signal 18 in an integrating device, including a large capacitor for example, capable of retaining charge for a period of several seconds, and passing the histogrammic signal for an accurately predetermined period of time. The resulting reading, when calibrated to consider the time interval, will give a fixed value for the average amplitude.

It should be borne in mind that the above explanation and FIGS. 1, 2, 3 and 3a are concerned with a simplified form of the invention that does not compensate for coincidence. The operation and principles are, however, equally applicable when provision is made for such compensation. In the structure described below, in connection with FIGS. 5, 6 and 7, a simplified arrangement is considered also.

In FIG. 5 a modified form of the apparatus of the invention is illustrated in block diagram form. It differs from the structure of FIG. 2 in several respects, the most important of which is the manner in which the interval from level to level is obtained. The transducer 130 may be of any suitable type, the output at 132 being some form of electrical pulse, which when applied to suitable circuitry identified generally as the main amplifier 134 provides an output at 136 in the form of pulses whose amplitudes are proportional to the size of the respective particles causing the same. Since transducer 130 is identified generally, the pulse may be proportional to cross-sectional area or volume. In FIG. 6, the output of the main amplifier is illustrated as including three pulses 71, 72 and 73 chosen conveniently in the diagram to be the same size as the pulses of the same reference characters respectively in FIG. 3. Although not shown in FIG. 3, there is a certain amount of low amplitude "hash" caused by small particles of debris and circuit noise just above the base line, and this is shown at 140 in FIG. 6. The pulses 71, 72 and 73 will emerge from this hash or "grass" as it is sometimes termed when viewed on a cathode day oscilloscope. The signal consisting of the grass and pulses appears at the point 136.

The output 136 of the amplifier 134 is applied through the electronic switch 142 to the memory circuit 144, the output of the electronic switch being designated 146. The output 148 of the memory circuit 144 is applied in turn to a high impedance buffer amplifier 150 and thereafter, the circuit is not much different than that of FIG. 2. Accordingly the same reference characters are applied to the remainder of the block diagram as in FIG. 2, although it should be noted that the meter 126 in this case is designated mean particle size meter, instead of mean particle volume meter.

Since the electronic switch 142 is normally open, no signal can pass this switch from the main amplifier to the memory circuit 144 unless the electronic switch is closed. The signal at 136 is applied by the channel 152 to a base line clipper 154 which cuts out the grass so as not to produce false operation of the one shot multivibrator 156 because of noise pulses or other pulses not intended to be included in the determination. The pulse such as 71 rising from the noise appears at 158 superimposed on top of the threshold level $v_{th}$ established by the clipper. This resulting signal 158 is shown in broken line form in FIG. 6, following the pulses 71, 72, and 73 above the clipper threshold $v_{th}$ and otherwise lying on that level. When the signal at 158 reaches a peak, normally at the maximum excursion of the pulse 71, a trigger will be produced in the peak detector 160 and this trigger will be applied at 162 to the one shot multivibrator 156. The pulse from the multivibrator appears at its output 164 and is shown in FIG. 6 as the narrow pulse 164 within each of the large pulses. This narrow pulse renders the electronic switch 142 conducting and thus the switch is closed so that the memory circuit 144 is connected to the main amplifier for the duration of the pulse 164. Since this occurs at the peak of the pulse such as 71, for example, the capacitor in the memory circuit 144 will either be charged or discharged until it is substantially at the same potential as the main amplifier 134, and the circuit constants are chosen so that this occurs within the time that the multivibrator closes the electronic switch.

As seen in FIG. 6, assuming that a previous pulse has left the potential of the condenser of the memory circuit 144 remaining at the level $L_1$, as soon as the electronic switch 42 closes, the voltage of the memory circuit will rise along the line $R_1$ to the level $L_2$, which is substantially the same as the peak amplitude of the pulse 71. Thereafter, the level $L_2$ will drop at $R_2$ to the level $L_3$, which is the peak amplitude of the pulse 72 and the signal 18 subsequently will rise at $R_3$ to the level $L_4$.

Again, the histogram 18 has been produced at the output 122 of the buffer amplifier 150, and its various levels are proportional to, in this case being the same as, the amplitudes of the respective pulses at which each level starts. Furthermore, the duration of each level is determined by the interval between one point of the pulse at the beginning of the level and the identical point of the pulse at the end of that level. In this case the points are the peaks of the pulses, and in the case of the structure of FIGS. 2 and 3, the points are the instants that the trailing edges of the respective pulses cross a low threshold level. The interval distances $t_n$, $t_n'$, $t_n''$ and $t_n'''$ in FIGS. 3 and 6 are respectively substantially the same in both charts if the pulses are respectively identical. They are slightly shifted in one case relatively to the other, but this is immaterial. Obviously any suitable point on the pulses can be used as the starting point in time for the levels, if it is the same point on each pulse, and the periods between pulses are substantially longer than the durations of the pulses.

In FIG. 7 there is illustrated for purposes of clarification a form of electronic switch 142 which may be used in the structure of FIG. 5. When the narrow pulse 164 from the one shot multivibrator 156 is applied to the base of the transistor $Tr_1$ it causes current to flow through the emitter-collector circuit. This in turn causes the normally non-conducting transistor $Tr_2$ to have its base emitter circuit rendered conductive, and for this period of time, current may flow from 136 through the diodes $D_1$, $D_3$ to the terminal 146, or from the terminal 146 through the diodes $D_2$, $D_4$, to the terminal 136, depending upon which of these terminals is at the higher voltage. When the transistor $Tr_2$ no longer conducts because of the termination of the signal at 164, the terminals 136 and 146 are isolated from one another because of the polarity of the diodes, and the voltage which had appeared at terminal 146 remains thereat.

In each of the structures of FIGS. 2 and 5, the various components may be constructed in accordance with known electronic techniques. The following comprise simplified descriptions of the various blocks:

In FIG. 2, the low threshold circuit 87 can be any circuit which has an output when its input level exceeds a preselected value, and none when its input level is less than said preselected value, such as an overloaded differential amplifier or a Schmitt trigger circuit.

The trailing edge detector 92 can be a differentiating network such as a series capacitor and resistor in that order with a time constant small with respect to the durations of pulses involved, and a diode for bypassing or disconnecting output pulses of unwanted polarity.

The one shot multivibrator 94 can be any circuit which, upon arrival of an input trigger pulse, has as its output a pulse of predetermined amplitude, duration and polarity.

The shorting circuit 110 could be a transistor normally biased to cut off, with means for biasing to saturation by means of an input pulse to base-emitter junction.

The memory or pulse stretcher circuits 78 and 114 could be a diode and a capacitor connected such that the capacitor is connected to and is charged by the input when the signal is increasing and disconnected when it is decreasing.

The buffer amplifier 80 and 120 in each case could be a simple resistance coupled high impedance input amplifier for preventing loading of the prior circuit, yet capable of following its output voltage.

The baseline clipper 154 of FIG. 5 could be a quick-recovery amplifier biased below cutoff.

The peak detector 160 of FIG. 5 could be a differentiating circuit with means for providing an output upon each occurrence of a negative-going zero.

Considering now the effects of coincidence, this has been stated to cause a decrease in the count from a transducer, and an increase in the amplitudes of some of the pulses causing a value of average amplitude which is higher than it should be. Since this invention is concerned with ascertaining the true average size of a particulate system, the value which is obtained by the simplified forms of the invention which are described above must be reduced to some extent to achieve this true value.

As stated in the beginning of the specification, this is accomplished according to the invention by loading the histogrammic signal, removing from each portion thereof defined by a level, a quantity of charge which depends upon the effective volume of the sensing zone of the transducer and the number of pulses being produced. As will be seen, the loading is accomplished for a constant interval, once for each level, but the amount of loading is a percentage of the amplitude of the respective level and hence is proportional to this amplitude.

This form of loading is a rather simplified operation, but it is believed proper to consider the factors which give rise to the change in the average amplitude of the histogrammic signal caused by coincidence. Some attempt will be made to demonstrate this below.

In attempting to justify as a first approximation the application of a loading factor of a given kind to the histogrammic signal, certain assumptions are made, including one to the effect that the amplitude of coincident pulses will be two times that of a singleton pulse. This neglects triplets. Doublets where the amplitude is less than twice that of one, because the particles are not both in the transducer effective volume at the same time, are not subject to as accurate a correction.

The analysis may proceed on the basis of the charge transferred by the signal for a given measurement of time. The histogrammic signal is considered one of current, or charge per unit time.

The total charge of the signal for a given time may be represented by the expression for a very simple case.

(8)
$$q = 2i \cdot (T/N_R)N_C + i(T/N_R) \cdot N_R - N_C$$

where:

$q$ is the total charge
$i$ is the current amplitude of a single pulse (assuming all are identical)
$T$ is the total time of measurement
$N_R$ is the raw count of particles, uncorrected
$N_C$ is the number of doublets This expression says that the charge contributed by the doublets to the total signal, plus that contributed by the singlets is the total charge which, when divided by the total time will yield the average current. $N_R$ is defined in this derivation as $N-N_D$ where $N$ is the actual number of particles. Thus, the expression (8) may be reduced to a simple relationship (9)
$$q = Ti\, N/N_R$$

Continuing with the analysis, it is obvious that the expression (9) is considerably simplified over the situation as it actually exists, and that some other factor besides 2 might provide better results in attempting to estimate the apparent amplitude of pulses caused by coincident passage of particles through the transducer. In general, if we let $u$ be the factor by which the oversize pulses due to coincidence exceed the single pulses, the expression (8) can be written once more, but considering the new factor $u$

(10)
$$q = ue/R \cdot T/N_R \cdot N_C + e/R \cdot T/N_R \cdot (N_R - N_C)$$

where:

$e/R$ is the equivalent of $i$ (voltage over resistance).

This expression states that the total charge transferred during the measurement period T is the sum of the contributions made by the pulses representing coincident passages, plus the contributions made by the pulses representing non-coincident passages. Each of these is the product of the intensity of the individual pulses. In the case of the coincident pulses it is $u$ times the contribution of a single average particle, times the average duration of a plateau or level, times the number of happenings. In the case of the non-coincident pulses, the number of happenings is equal to the raw count minus the number of coincident passages.

The expression (10) may be reduced to

(11)
$$q = e/R \cdot T \cdot [1 + KN_R(u-1)]$$

in which K is some constant which has been ascertained statistically in connection with studies made of the Coulter apparatus. This constant is actually defined by a known expression.

(12)
$$F_c = KN_R$$

where $F_c$ is a correction factor proportional to the raw count. This expression is used in particle studies to correct counts for coincidence. The expression (11) was obtained by deriving a value for $N_c$ from the relations of true count $N_T$ with the other values. Thus, since $$N_T = (1+F_c)N_R$$

and $N_T$ is also equal to $N_R + N_c$ we were able to obtain an expression for $N_c$ which is

(13)      $N_c = KN_R^2$ for substitution into (10) to yield (11).

The expression (11) says that the total charge which is transferred during a measurement or per unit time is the correct value plus an error factor $KN_R(u-1)$ which is due to the production of abnormally high pulses and loss of count, both caused by coincidence. Compensation is achieved when the error factor is excised.

If we discard a given quantity of charge $q_c = e/R \cdot t_c$ at each pulse, with $t_c$ being the duration of the excised portion, then during the course of a given time T we discard $N_R$ of these charges for a total discard of $N_R \cdot e/R \cdot t_c$ coulombs. The charge output thereafter becomes

(14)      $q' = e/R \cdot T[1+KN_R(u-1)] - N_R \cdot e/R \cdot t_c$

In order for this to be $e/R \cdot T$ as desired, by adjustment of the expression, it is found that the conditions that are to be satisfied are

(15)      $t_c = TK(u-1)$

This expression means that the duration of excising or loading interval for each pulse is proportional to the constant $(u-1)$, that is, it is proportional to the amount than an average doublet pulse exceeds a singlet pulse. This gives us a linear equation which enables the duration of loading to be achieved by a simple operation such as adjusting a potentiometer in a timing circuit.

With respect to the amount of loading, or the percentage, this can be deduced from the considerations stated above. A simple but rigorous expression for this is

(16)      Total percent loading = $N_R K(u-1) \times 100$

The significance of this derived expression is that the percent loading is proportional to the raw count $N_R$. The value K is a constant which is dependent upon the characteristics of the transducer, and is known. The expression $(u-1)$ is the amount by which the average doublet pulse exceeds a singlet pulse, and is a fixed number. Since this is a percentage, obviously the amount of charge excised from each pulse will be a fixed percent of the increment charge contributed by that pulse.

To recapitulate, it has been proven that the loading which is applied to the total signal is a fixed percentage of the signal, and each pulse may have its charge decreased by a fixed percent to compensate for coincidence. The fact that the charge withdrawn is proportional to the raw count means that it is permissible to withdraw an increment of charge from each pulse. The actual percentage chosen can be adjusted on the basis of the value K and by varying circuit constants until changes in concentration make little or no changes in the average amplitude indicated by the apparatus.

From the above, one can withdraw charge in many ways. The actual discussion assumed, as an example, that the current was cut off from the signal all the way to the base line for a fixed duration for each pulse, in which case the amplitude of the excised portion was proportional to the amplitudes of the respective pulses. Another way would be to "chop" out portions of the signal, not necessarily from peak to base line, and not necessarily for the same amount for each pulse. One example described hereinafter uses a continuously occurring reduction by not forming a perfect histogram, excising an additional amount of charge to meet the requirement that change of concentration resulted in no substantial change in average value indicated by the output.

In FIG. 8 there is illustrated a block diagram of a practical device which loads the histogrammic signal to compensate for coincident effects. The primary difference between this apparatus and that of FIGS. 2 and 5 is that in this structure there is a so-called loading stage 200, driven by the signal from the one-shot multivibrator 156 which loads the output signal from the buffer amplifier 150 for a fraction of each pulse. The signals are accumulated by the integrator 202 through the AND gate 204 which in turn is controlled by the start signal through a control circuit 206 applied to a timing interval generator 208. The initiation of the start signal would normally be influenced by the operation of the transducer 130. The integrator 202 accumulates charge for a predetermined time, and applies this to the mean particle volume meter 126 which is suitably calibrated to give the average level of the histogrammic signal in the output of the buffer amplifier 150. When a determination has been made, the integrator 202 may be manually reset via the line shown at 210.

It will be noted from a comparison of the block diagrams of FIGS. 2, 5 and 8, that while there are many components in common there are differences between them. In the discussion of FIG. 8 it has been assumed that the histogram which is operated upon by the loading stage 200 is fairly faithful to the configuration of the histogram 18 previously referred to. Indeed, this is desirable and advantageous. Note, however, that there is no electronic switch in the diagram of FIG. 8, nor any other provision for holding the output signal in the buffer amplifier 150 at any attained level to enable the output to follow the levels corresponding to pulse peaks. Accordingly, the voltage in the output of the buffer amplifier is permitted to drop prior to the advent of each pulse with the results that the histogram of this apparatus loses a portion for each pulse, and will gain a portion from some pulses as well, but the losses will be greater than the gains. This suggests a highly economical structure for compensating in a rough way for some of the effects of coincidence, and it will be explained in connection with FIGS. 9 and 10. Since the amount of charge which is excised by loading will further modify the loss of charge inherent in the histogram produced in this apparatus, the explanation will be undertaken in the basic circuit, shown in FIG. 9, without regard to loading. The interaction of the elements of FIG. 8 will be detailed subsequently with reference to FIG. 11.

Note that in FIG. 9 there is no electronic switch. The signal which emerges from the output 136 of the main amplifier 134 is applied by the channel 88 to the low threshold circuit 87 and also to the memory circuit or pulse stretcher 144. Again, in FIG. 10, the pulses are shown at 71, 72 and 73. The signal at the output 118 of the memory circuit 144 is initially at the level $L_1$, corresponding to the peak of a prior pulse. This level continues until the actual pulse 71 itself appears. As this pulse crosses the voltage level $v_{th}$ which is provided by the circuit 86, the leading edge of the resulting signal 90 produces a trigger appearing at 108, driving the shorting circuit 110 and discharging the condenser of the memory circuit 144 through the connection 112. The level $L_1$ now drops along the vertical $R_1$ the remainder of the pulse 71 comes through the pulse stretcher 144 at 118 to drive the buffer amplifier 150 and likewise to appear at 84 as the input to the low pass filter 124 and the meter 126.

When he peak of the pulse 71 is reached, the memory circuit 144 retains its charge and thus establishes the second level $L_2$. In similar manner, the vertical portions $R_2$ and $R_3$ as well as the other levels $L_3$ and $L_4$ are formed.

Considering the effect of the wave form 218 of FIG. 10, which may be considered a modified histogram, and using as our reference point the instant that the pulse 71 reaches its peak, we may estimate the loss of charge occasioned by the very histogram itself. This can be done by comparing the actual wave form 218 with the wave form 18 (FIG. 6) with the levels extending from peak to peak. The areas lost are shaded in one direction, and those gained are shaded in another. For the pulse 71, the shaded area lost is 221, the area gained is 222. For the pulse 72 the area lost is 223 and there is no area gained. For the pulse 73, the area lost is 224 and the area gained is 225.

If the areas lost were equal to the areas gained, the histogram 218 would be as good as the substantially perfect histogram 18, and the simplicity of the circuit would commend it for many applications. It happens that the amount lost is greater than the amount gained, and even this is advantageous, because it provides a built-in coincidence correction which is a function of the raw count $N_R$. It is a simple matter to "chop" out a portion which is a percentage of the respective pulses, and make the adjustments to achieve the desired compensation. One need only build an approximate loading device, and adjust the percentage and duration until the desired value of average amplitude is reached. This may be tested with variations in concentration to assure its accuracy and validity.

The actual device which was built to provide the desired indication was intended especially for use in ascertaining mean cell volume of red blood cells. In such a system, the values with which one is concerned are quite similar in most cases. Pulse amplitudes in the circuits at the output of the main amplifier are of the order of ten volts; the time between pulses for an ordinary dilution of 1:50,000 is about 250 microseconds; the pulses are of the order of 30 microseconds in width and practically the same width in each case. The charts are compressed in FIGS. 3, 6 and 10 for convenience. One shot multivibrators which will give the signal an opportunity to follow voltages of adjacent stages conveniently may be adjusted to produce pulses of the order of two or three microseconds.

In FIG. 11 there is illustrated an electronic circuit embodying the major components of FIG. 8, with some minor modification. Where feasible the same reference characters are used to identify the components as in previous figures.

The output of the transducer 130 is applied to the main amplifier 134, and an additional buffer amplifier 260 is inserted to prevent loading of the main amplifier 134. The input voltage at 261 is 15 volts full scale. The transistor $TR_3$ as well as most of the others in the circuit are fairly conventional. Since a list of the values of the resistors and capacitors will not be given, the transistor types are provided in FIG. 11 to enable one skilled in circuitry of this type of derive suitable constants. The point 136 corresponds to the same point of FIG. 8, being the input to the memory circuit 144 and to the low threshold circuit 87. The signal comprising the pulses from the main amplifier 134 is applied simultaneously to the memory circuit 144 and the low threshold circuit 87. The latter establishes the threshold level $v_{th}$ of FIG. 10 at its input and produces a rectangular wave in its output at 90. The circuit of FIG. 8 uses a single leading edge detector 93 for driving the one shot multivibrator 156 and for operating the shorting circuit 110, but in FIG. 11, there are two leading edge detectors. The circuit designated 3 passes only the leading edge to the one shot multivibrator 156 by the channel 96, and the input to the shorting circuit 110 will also act as a leading edge detector.

The memory circuit 144 has a charging circuit which includes a condenser C which when once charged to a suitable potential retains that potential by virtue of the diode arrangement shown at $D_5$ connected to a high positive potential. The energizing of the shorting circuit 110 permits the condenser C to discharge to the potential of the instantaneous value of the input signal at 136, differing only by the potential drop in the string of diodes $D_5$. The shorting circuit output is a sharp trigger shown in FIG. 10 at 108 so that immediately thereafter the pulse voltage is applied for the remainder of the rise to the input 118 of the buffer amplifier 150.

Note that the input to the buffer amplifier 150 is applied to a so-called field effect transistor $Tr_8$ which has a very high input impedance so as not to load the condenser C. The transistor is connected in a source-follower configuration. The other transistors of this stage comprise a phase inverter with feedback, providing an emitter-follower output at 84. The peak of the pulse maintains the condenser C at the maximum charged reached, until the next trigger pulse comes along.

Considering only the output at 84, this is applied to a low-pass filter 124 and into the "AND" gate 204, which in this case is a simple switch adapted to be closed by a suitable relay in the timing interval generator 208. The generator 208 in turn is activated by a control circuit so that the switch in the "AND" gate 204 operates for only a period of time chosen. The output fro mthe "AND" gate accumulates in the integrator 202 and in turn drives the servo system 265 that in turn drives the mechanical display dial 267 relative to a window.

In order to load the signal from the buffer amplifier 150, the leading edge detector 93 has an output consisting of a sharp single trigger off the leading edge of the threshold signal 90. This trigger is applied at 96 to the input of a one-shot multivibrator 156 to produce a narrow pulse of controlled width at the input 102 to the loading stage 200. The purpose of the loading stage 200 is to assure that the loading pulse is sharp and has sufficient swing for the diode in the stage to be either at saturation or at cut-off. The signal at 84 being negative in this circuit, the swing of the loading pulse must be sufficient to cut off the diode so that the loading will occur precisely as desired. The resistor $R_5$ controls the amount of loading, but once adjusted for proper compensation can be fixed. Loading is applied just before the "AND" gate 204 by channel 212, but as previously stated could be applied at the integrator 202, or even in the buffer amplifier 150.

In this circuit, as in all of the other apparatus described, the method of decreasing the charge of the hisogrammic signal is to load it each time that a pulse arrives at the input of the apparatus. This, in effect, means that the loading occurs in proportion to the raw count $N_R$ and may be called, therefore, impulse loading. As previously shown, the percentage of the loading is constant which makes it a simple matter to construct apparatus for application of such loading. It has been pointed out, for example, that one might take the effects of a modified form of histogrammic signal without any correction by additional loading and obtain a fairly good compensation. The economy of such an arrangement is obvious.

Modifications of the invention are capable of being made in many details without departing from the spirit or scope of the invention.

What it is desired to secure by Letters Patent of the United States is:

1. Apparatus for producing an indication representing the mean size of a plurality of particles, which comprises: transducer means responsive to the passage of particles relative thereto for producing a string of electrical pulses whose amplitudes are respectively proportional to the size of the particles producing the same, means for converting said pulses into a monopolar signal of substantially histogrammic configuration, the monopolar signal having levels whose amplitudes are respectively proportional to the amplitudes of said pulses and whose durations are substantially the same as the time from pulse to pulse, and means for detecting the average amplitude of said monopolar signal.

2. Apparatus as claimed in claim 1 in which the monopolar signal has substantially no intervals therein.

3. Apparatus as claimed in claim 1 in which the monopolar signal has a discontinuity generated in timed relation to the production of each pulse whereby the total value and hence the average amplitude of the signal is decreased by such discontinuities.

4. Apparatus as claimed in claim 1 in which the converting means includes a memory device connected to receive the pulses from said transducer and adapted to retain electrical charges therein and means for changing the amount of charge each time one pulse is received, the charge retained due to any one pulse being proportional to the amplitude of the pulse, and the changing means acting upon the receipt of the pulse following said one pulse to change the first retained charge to a new amount of charge proportional to the amplitude of the following pulse, the interval from change to change being the same as the interval from pulse to pulse, said monopolar signal being proportional to the continuous condition of the charge of said memory device.

5. Apparatus as claimed in claim 4 in which the average detecting device includes an averaging meter.

6. Apparatus as claimed in claim 4 in which the average detecting device comprises total charge accumulating means connected to the memory device, means for applying the charge of the memory device to the accumulating means for a predetermined time, and means for computing and indicating the accumulated charge per unit time.

7. Apparatus for producing an indication representing the average size of particles of a particulate system, which comprises: transducer means responsive to the passage of particles within the sensing zone thereof for producing a plurality of successive electrical pulses whose amplitudes are for the most part proportional to the size of the individual particles producing the same, but including a number of pulses of increased amplitude due to the occurrence of coincidental passage of more than one particle within the sensing zone of said transducer, means connected to receive the pulses from said transducer for converting the said pulses into a monopolar signal of substantially histogrammic configuration having levels whose amplitudes are respectively proportional to the amplitudes of said pulses and whose durations are substantially the same as the time from pulse to pulse, means connected to the converting means for detecting and providing an output signal proportional to the average amplitude of the levels of said monopolar signal, and means connected within said apparatus for decreasing the output signal by an amount substantially proportional to the increased amplitude caused by said coincidental passage.

8. Apparatus as claimed in claim 7 in which said means for decreasing the output signal comprises a loading circuit connected with said apparatus and including therein means for loading the monopolar signal such that said signal may be affected only by such loading to excise a portion of said monopolar signal each time a pulse occurs.

9. The apparatus of claim 8 in which the loading circuit has parameters which are selected such that the excised portion is a fixed percentage of the amplitude of the monopolar signal at the time of loading, related to the coincidence characteristics of the particulate system and transducer.

10. The apparatus of claim 7 in which the converting means includes charge retaining means responsive to the pulse amplitudes successively received, said apparatus further includes means for changing the retained charge each time a pulse occurs such that the monopolar signal is in the form of a current versus time signal, with the amplitudes being current values, and said decreasing means comprises a loading circuit for withdrawing an amount of charge from the monopolar signal and means momentarily connecting the loading circuit to affect said monopolar signal each time a pulse occurs.

11. In a particle study apparatus which includes a transducer having a zone through which a liquid suspension of particles is adapted to move, the transducer having the character such that the movement of a particle through the zone will produce an electrical pulse whose amplitude is proportional to the size of the particle, and the apparatus having means for moving a sample suspension of particles through the zone to produce a string of such pulses, the combination which comprises: structure for deriving an indication of the average size of the particles of said suspension, said structure comprising a pulse converting circuit for changing the string of pulses into a monopolar histogrammic signal having a plurality of level each proportional in amplitude to the amplitudes of respective pulses, the duration of the levels being the time interval from the pulse relating to said level to the next succeeding pulse; and means for averaging said histogrammic signal and obtaining a single electrical quantity representing said average.

12. The combination claimed in claim 11 in which the structure includes a loading circuit for excising a portion of said histogrammic signal to an extent dependent upon the number of pulses and their amplitudes to compensate for coincident effects of particles in the transducer.

13. The combination of a particle analysis device having a Coulter type transducer producing a plurality of electrical pulses as a result of flowing a suspension of particles through the sensing zone of the transducer, the pulses having amplitudes proportional to the volumes of the respective particles producing said pulses and occurring at random intervals; a pulse stretcher operated by successive pulses and adapted to aquire and store a monopolar potential of an amplitude proportional to each pulse for a time until the next succeeding pulse arrives, and then change its potential to one proportional to the amplitude of said next succeeding pulse, whereby the pulse stretcher potential follows a monopolar histogrammic characteristic; an electrical signal averaging device; and means for transferring the pulse stretcher potential charcteristic to said averaging device to obtain in said averaging device an indication representing the average potential of said pulse stretcher.

14. The combination of claim 13 in which said averaging device includes an integrator connected to said transferring means and accumulating charge related to said pulse stretcher potential characteristic, and indicating means responding to the charge accumulated for the interval of accumulation.

15. The combination of claim 13 in which there is provided impulse loading means connected to reduce the average potential of the pulse stretcher by a factor proportional to the amplitudes of the respective pulses and to their number.

16. For a particle analyzing apparatus of the type in which a plurality of particles passing within the sensing zone of at transducer produces a string of electrical pulses as a result of such passage, the pulses having their amplitudes proportional to the size of the respective particles producing the same, the pulses occurring at random intervals simultaneously with the respective passage of particles producing same, and the apparatus including an electrical circuit having output means at which said electrical pulses appear, the combination which comprises a device for obtaining an indication of the average size of the plurality of particles, and including:
(a) an electronic circuit for responding to substantially the peak of an electrical pulse and maintaining an electrical charge therein which is proportional to said peak,
(b) means for connecting the said electronic circuit with the output means so that the electrical pulses may be applied to said electronic circuit,
(c) means for enabling said electronic circuit to change the maintained electrical charge which is produced in response to one of said pulses to a second electrical charge proportional to the peak of said next succeeding pulse, when that next succeeding pulse occurs, and for following the conditions of charge of said electronic circuit to produce a substantially histogrammic signal, and
(d) means for averaging the histogrammic signal to obtain said indication.

17. The combination of claim 16 in which said electronic circuit includes a first memory circuit, said connecting means includes a second memory circuit and a normally inoperative transfer channel between the two memory circuits so that the first memory circuit is adapted to respond to a charge condition of the second memory circuit but only when said channel is rendered operative, the second memory circuit is adapted to accept a first pulse from said output means and assume a charge proportional to the peak of said first pulse, the enabling means includes a switching circuit activated by a portion of said first pulse to render the transfer channel operative momentarily whereby the first memory circuit detects and assumes the charge of the second memory circuit and maintains the same, and the switching circuit also serves to discharge the second memory circuit to a low value of charge to enable the acceptance of the next succeeding pulse.

18. The combination of claim 16 in which said electronic circuit includes a memory circuit, said connecting means includes a normally inoperative transfer channel so that the memory circuit is adapted to respond to the pulses from said output means but only when the channel is rendered operative, the enabling means includes a switching circuit activated by the peak of a first pulse appearing at said output means to render the transfer channel operative only momentarily at said peak of said first pulse for a time sufficient to enable the memory circuit to changes its condition of charge from whatever it was before and to assume a charge proportional to said peak and maintain the same until the next succeeding pulse once more renders the transfer channel operative.

19. The combination of claim 16 in which said electronic circuit includes a memory circuit, said connecting means comprises a continuously conductive channel, and said enabling means comprises a circuit adapted to be activated by a first pulse from said output means momentarily to discharge said memory circuit near the beginning of said pulse to a substantially fully discharged condition, whereby to enable said memory circuit to be charged by said first pulse to a condition of charge proportional to the amplitude of said first pulse and irrespective of the prior condition of charge, the memory circuit maintaining said charge proportional to the amplitude of said first pulse until the next activation of said changing means circuit.

20. The combination of claim 16 in which means are provided to load said histogrammic signal by a factor to compensate for the condition of particle coincidence.

21. The combination of claim 16 which includes an impulse loading circuit connected to excise charge from said histogrammic signal in accordance with a predetermined function for compensating for the occurrence, if at all, of coincident in the passage of particles within the scanning zone of said transducer.

22. In a particle analyzing apparatus of the type in which a plurality of particles passing within the scanning zone of a transducer produces a string of electrical pulses as a result of such passage, and the pulses for the most part having their amplitudes proportional to the size of the respective particles producing the same, but there being pulses of increased amplitude caused by passage of plural particles simultaneously, the pulses occurring at intervals simultaneously with the respective passage of particles and multiples of particles producing the same, and the apparatus including an electrical circuit having output means at which said electrical pulses appears, the combination which comprises a device for obtaining an indication of the average size of the plurality of particles having regard to the occurrence of their coincidence within said scanning zone, and including:
(a) an electronic memory circuit including a charge retaining capacitor,
(b) means including an electrical conduction path for connecting the memory circuit to said terminal means whereby any pulse applied to the memory circuit will apply a charge to said capacitor, but said charge will be retained at maximum value proportional to the amplitude of said pulse, notwithstanding decay of said pulse thereafter,
(c) a high input impedance amplifier stage following the memory circuit and responsive thereto and having an output signal which follows in character the charge of said memory circuit,
(d) switching means for discharging the condenser.
(e) means for operating the switching means at a point near the leading edge of each pulse but only momentaritly whereby the charge on the condenser will drop to a very low value at said point from whatever charge was being retained thereon and immediately will follow said pulse to its peak and retain a new charge proportional to the amplitude of said peak, the resulting character of charge on the capacitor comprising a histogrammic signal with small discontinuities, and said signal appearing at the output of said amplifier stage, and
(f) averaging means for averaging the amplitude of said histogrammic signal.

23. The combination of claim 22, and including an addition to the components designated (a) to (f) the following:
(g) a loading stage connected to load the signal between the averaging means and the memory circuit,
(h) means rendering the loading stage effective to load said signal to a predetermined extent each time a pulse occurs, to compensate for coincidence and operated by the occurrence of a pulse, and
(i) said averaging means including a integrator for accumulating said signal for a predetermined period of time.

24. The combination of claim 23 in which said averaging means includes a servo device driven by said integrator and connected to rotate a dial to a position indicating said average size.

25. A method of producing an indication representative of the mean particle volume of a sample of microscopic particles which comprises:
(a) passing the sample through the sensing zone of a transducer whose output comprises a string of electrical pulses having amplitudes respectively proportional to the volumes of the particles and durations respectively proportional to the times that the particles require to pass through the sensing zone,
(b) converting the string of electrical pulses into a monopolar electric signal of generally histogrammic configuration comprising a series of amplitude levels, each level occurring between the same points of two successive pulses, whereby the duration of the level is equal to the interval from pulse to pulse, and the amplitude of the level remains constant and proportional to the amplitude of the earlier of each two successive pulses, and (c) detecting the average amplitude of said monopolar electric signal.

26. A method as claimed in claim 25 which comprise,s in addition thereto, excising a portion of the monopolar electric signal prior to detection by a percentage related to the coincidence of the particles in passing through said sensing zone.

27. A method of producing an indication representative of the average amplitude of a string of random pulses of various amplitudes which comprises:

(a) converting the string of electrical pulses into a monopolar electric signal of generally histogrammic configuration comprising a series of amplitude levels, each level occurring between the same point on two successive pulses whereby the duration of the level is substantially equal to the interval from pulse to pulse, the amplitude of each level is constant and proportional to the amplitude of the earlier of said two successive pulses, and (b) detecting the average amplitude of said monopolar electric signal.

28. A method of determining the 50% above stated size point on the integral or percent above stated size characteristic of a particulate system which comprises:

(a) passing a suspension of the particles of good statistical sampling amount through a Coulter type transducer to obtain a string of electrical pulses having amplitudes proportional to the respective particle producing the same in passage, and the pulses occurring at intervals identical to the intervals of particle passage, (b) converting the string of pulses into a continuous, monopolar electric signal, the signal being formed of a series of amplitude levels each occurring during one of said intervals and having an amplitude substantially proportional to the pulse occurring at the beginning of the interval, (c) accumulating a charge representative of said electric signal, and (d) averaging the electric charge over the total time of passage of the sample to obtain the current value thereof, said value being proportional to the average volume of all of said particles and comprising said 50% point.

29. Apparatus for deriving an indication representing the mean amplitude of a string of randomly occurring electrical pulses of random amplitudes, which comprises: an input circuit adapted to be connected to a source of said pulses to have the pulses occur in said input circuit, electrical quantity storing means having a character such that it will assume and store an electrical quantity therein proportional to the peak of an electrical pulse which is applied thereto, switching means activated by each pulse consecutively, at least momentarily to connect the quantity storing means to said input circuit whereby to enable said quantity storing means to change its previous stored condition to a new stored condition in which the electrical quantity stored is proportional to the peak of the pulse activating the switching means and irrespective of the electrical quantity previously stored, a circuit means responsive to the stored condition of the quantity storing means and connected therewith for following said stored condition and thereby providing a histogrammatic signal having a plurality of levels each proportional to the respective amplitudes of the pulses producing the respective stored conditions, the levels being of durations substantially the same as the respective intervals from pulse to pulse, and averaging means connected to said responsive circuit means for averaging the histogrammic signal and producing an electrical output comprising said indication.

30. Apparatus for determining the average amplitude of a plurality of randomly occurring pulses of random amplitudes which comprises: means for receiving and converting said pulses into a monopolar signal of substantially histogrammic configuration having levels each of an amplitude which is respectively proportional to the peak amplitudes of said pulses and each of a duration substantially the same as the respective time from pulse to pulse, and means for detecting the average amplitude of said monopolar signal and thereby the average amplitude of said pulses.

31. Apparatus as claimed in claim 30 in which said receiving and converting means includes pulse responsive switching circuitry for modifying said monopolar signal by creating discontinuities therein and thereby reducing the average amplitude of said signal.

32. Apparatus as claimed in claim 30 which further comprises impulse loading means for reducing the average amplitude of said monoplanar signal.

References Cited

UNITED STATES PATENTS

| | | | |
|---|---|---|---|
| 3,028,501 | 4/1962 | Lamparter | 250—218 |
| 3,275,834 | 9/1966 | Stevens | 250—218 |

MALCOLM A. MORRISON, Primary Examiner

F.D. GRUBER, Assistant Examiner

U.S. Cl. X.R.

235—183; 307—235, 246, 273; 324—71; 328—127

UNITED STATES PATENT OFFICE
CERTIFICATE OF CORRECTION

Patent No. 3,473,010                          October 14, 1969

Leo B. Bloomfield et al.

It is certified that error appears in the above identified patent and that said Letters Patent are hereby corrected as shown below:

Column 1, line 23, "componsate" should read -- compensate --. Column 3, line 18, "The" should read -- This --. Column 4, line 43, "compensation. For" should read -- compensation for --. Column 5, line 33, "volumes" should read -- volume --; line 68, after "diameter" cancel "then"; line 69, after "diameter," insert -- then --. Column 6, line 9, "particles", first occurrence, should read -- particle --; line 47, "times" should read -- time --. Column 9, line 27, "the" should read -- this --. Column 10, line 71, cancel "ond bucer amplifier 120 and the output of this amplifier". Column 11, line 41, "Mention" should read -- Mentions --. Column 12, line 25, "day" should read -- ray --; line 48, "This" should read -- The --. Column 17, line 14, "he" should read -- the --; line 37, "smiple" should read -- simple --; line 71, "of" should read -- to --. Column 18, line 7, "3" should read -- 93 --; line 60, "hisogrammic" should read -- histogrammic --. Column 20, line 29, "level" should read -- levels --. Column 22, line 2, "coincident" should read -- coincidence --; line 24, "them emory" should read -- the memory --. Column 23, lines 41 and 42, "susstantially" should read -- substantially --. Column 24, line 16, before "signal" insert -- electrical --.

Signed and sealed this 26th day of May 1970.

(SEAL)
Attest:

EDWARD M. FLETCHER, JR.                      WILLIAM E. SCHUYLER, JR.
Attesting Officer                              Commissioner of Patents

UNITED STATES PATENT OFFICE
CERTIFICATE OF CORRECTION

Patent No. 3,473,010                                          October 14, 1969

Leo B. Bloomfield et al.

It is certified that error appears in the above identified patent and that said Letters Patent are hereby corrected as shown below:

Column 17, line 6, "86" should read -- 87 --.

Signed and sealed this 9th day of June 1970.

(SEAL)
Attest:

Edward M. Fletcher, Jr.
Attesting Officer

WILLIAM E. SCHUYLER, JR.
Commissioner of Patents